United States Patent [19]
Lott et al.

[11] 3,777,669
[45] Dec. 11, 1973

[54] PARTS CONVEYOR PALLET AND MEANS FOR SUPPORTING SAME ON AN INITIAL PAIR OF RAILS AND SWITCHING SAME TO A SECOND PAIR OF RAILS

[75] Inventors: George T. Lott, Wyoming; Francis H. Little, Cincinnati, both of Ohio

[73] Assignee: Lott Tool Company, Cincinnati, Ohio

[22] Filed: Aug. 16, 1972

[21] Appl. No.: 281,126

Related U.S. Application Data

[62] Division of Ser. No. 139,672, May 3, 1971, Pat. No. 3,717,103.

[52] U.S. Cl................. 104/130, 104/119, 105/144, 105/215 R
[51] Int. Cl............................................ E01b 25/26
[58] Field of Search..................... 104/96, 100, 101, 104/105, 130, 131, 118, 119, 121, 242, 243; 105/141, 144, 147

[56] References Cited
UNITED STATES PATENTS

| | | | |
|---|---|---|---|
| 3,659,529 | 5/1972 | Jacobs | 104/130 |
| 3,033,126 | 5/1962 | Graybeal | 104/101 |

*Primary Examiner*—Gerald M. Forlenza
*Assistant Examiner*—D. W. Keen
*Attorney*—Melville, Strasser, Foster & Hoffman

[57] ABSTRACT

A pallet for conveying parts through a succession of work stations. The primary support for the pallet comprises a pair of vertically aligned tubular rails. The pallet is support on these rails by a pair of upper rollers mounted on said pallet and riding on the upper rail and a pair of lower rollers mounted on said pallet and riding on the lower rail along with a third pair of intermediate or clamping rollers, shiftably mounted on said pallet, which cooperates with the upper rollers to clamp the pallet to the upper rail. In this manner the pallet is cantilevered from the top rail. The pallet is driven by means of a downwardly extending arm having a spring loaded friction plate which frictionally engages the top of a flat segmented (crescent) chain disposed beneath the pallet and continuously driven by conventional means. The first mentioned rails are disposed in a continuous path. Each work station is mounted to one side of said path. For each work station there is a side pair of vertically aligned rails extending closely adjacent to and parallel to said first mentioned rails a relatively short distance, then leaving said first mentioned rails to lead to a said work station, and then extending back to said first mentioned rails wherein said side pair of rails is again closely adjacent to and parallel to said first mentioned rails a relatively short distance. A second chain, like the chain first described and running at the same speed thereof, is positioned beneath said side pair of rails at the same level as said first chain. The said plate extends beyond said first chain a distance sufficient to engage said second chain when said pallet is brought into proximity with said side pair of rails. Said pallet has mounted thereon a second pair of upper rollers, and a second pair of lower rollers, disposed to engage said side pair of rails when the pallet is brought to that position wherein the side pair of rails is parallel to said first mentioned rails. At this last mentioned point means are actuated to disengage said third pair of rollers from clamping engagement with said first mentioned upper rail while immediately causing a similar pair of clamping rollers to engage the upper of said side pair of rails whereby said pallet is then cantilevered from said side pair of rails by virtue of said second pair of upper rollers, said similar pair of clamping rollers and said second pair of lower rollers. Continued movement of the chains will cause the pallet to move along on the side rails to the work station. Similarly the pallet may be placed back on the first mentioned rails when the side rails are parallel thereto and means are actuated to again reverse the positions of said first mentioned, and said similar, clamping rollers.

5 Claims, 7 Drawing Figures

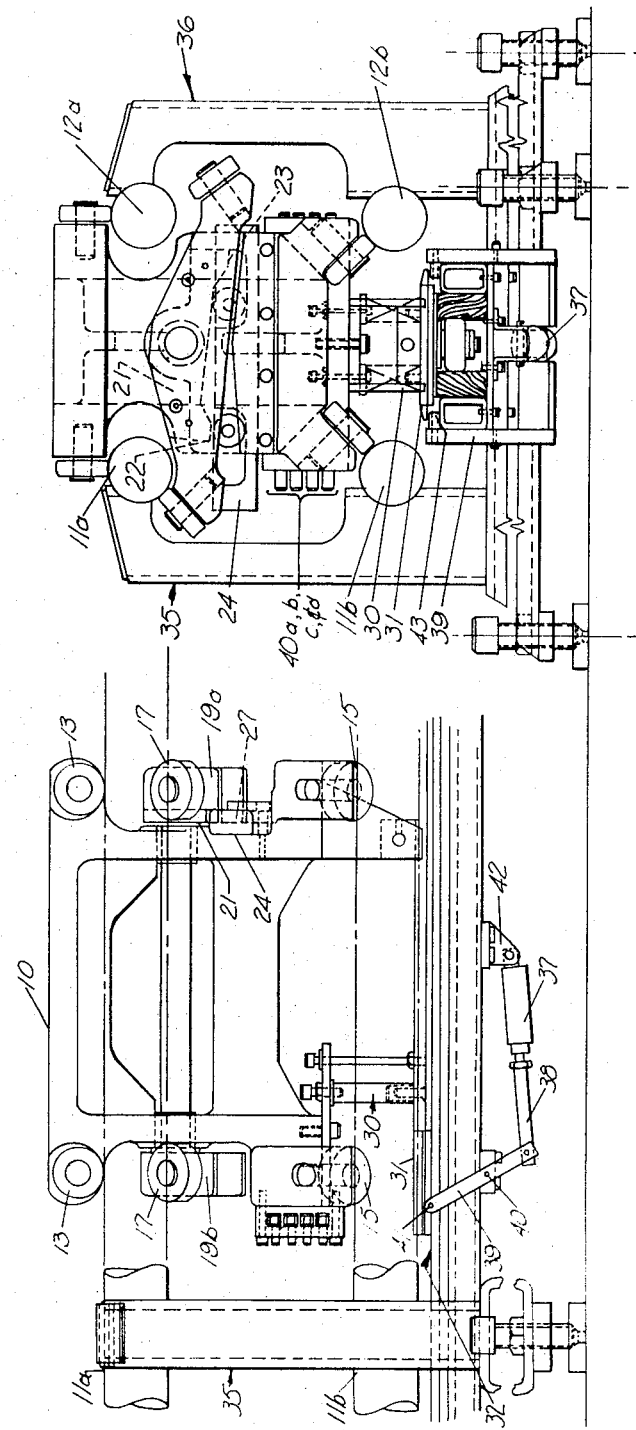

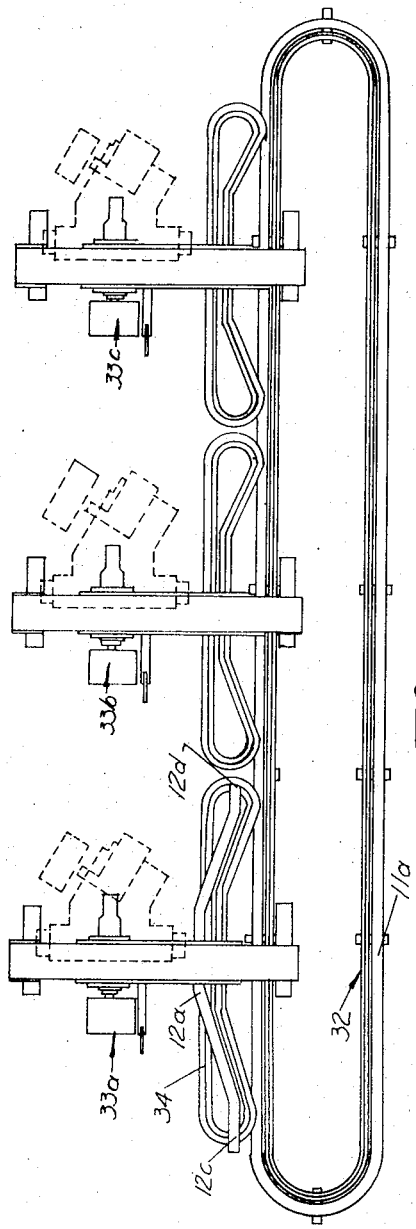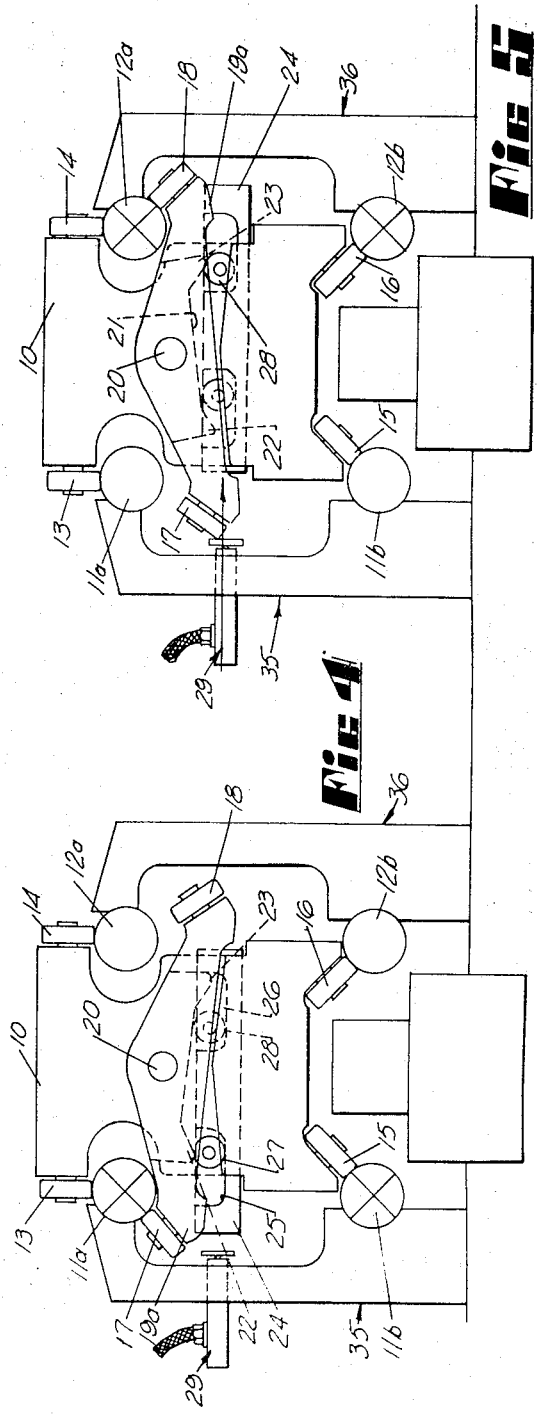

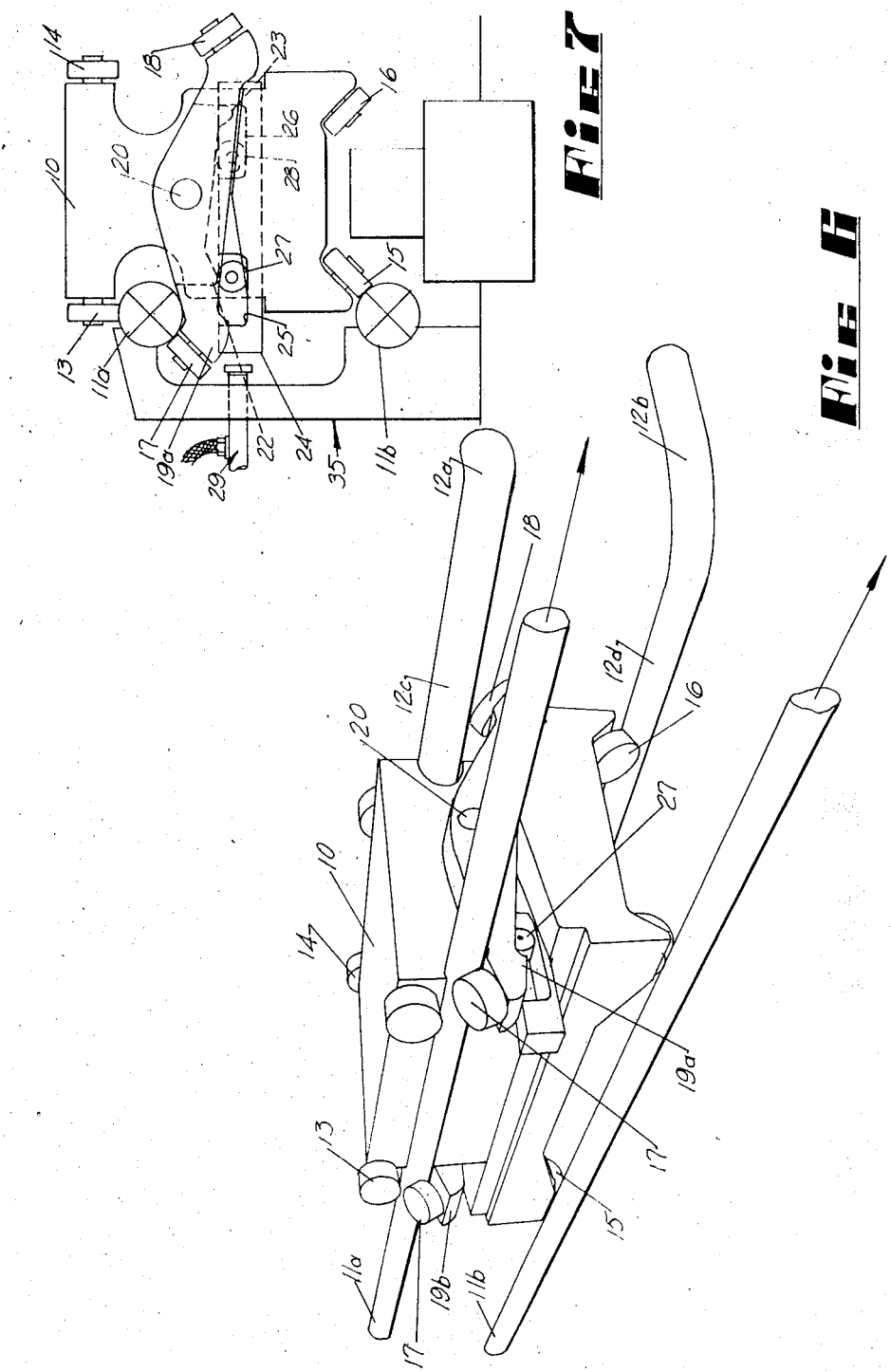

3,777,669

PARTS CONVEYOR PALLET AND MEANS FOR SUPPORTING SAME ON AN INITIAL PAIR OF RAILS AND SWITCHING SAME TO A SECOND PAIR OF RAILS

CROSS REFERENCE TO RELATED APPLICATIONS

This is a division of application Ser. No. 139,672 filed May 3, 1971, now U.S. Pat. No. 3,717,103 issued Feb. 20, 1973.

BACKGROUND OF THE INVENTION

1. Field of the Invention

This invention has wide application. It is useful in those industries wherein a given part is to have a number of machining operations performed thereon. The pallet-conveyor of this invention enables such a part to be taken sequentially through a number of work stations disposed to one side of a main track. Although the instant invention is particularly suitable for use in the automobile industry wherein a number of parts weighing within the range of 50 to 150 pounds must undergo successive machining operations, it will be obvious to those skilled in the art that this invention may have much greater use than that. It will be equally obvious that with relatively minor adjustments the pallet may be adapted to convey much lighter or much heavier loads than indicated.

2. Description of the Prior Art

No search has been made in the United States Patent Office to determine whether or not a pallet-conveyor system like that comprising the instant invention is shown in any issued U.S. patent. Although the inventors have a fairly extensive personal knowledge of this general art, they are not aware of any part conveying pallet arranged for cantilevered support from one set of vertically aligned rails and shiftable to similar cantilevered support from a second set of vertically aligned rails while the pallet is driven by combinations of continuously moving chains and the like.

SUMMARY OF THE INVENTION

Heretofore problems have arisen respecting the efficient handling of parts and the like which must have a plurality of operations performed thereon. It is expensive and time consuming to transport such parts, step by separate step, from one place to another. It is not always practicable to station the part in one place and change tools — one way or another. Mechanisms which have attempted to route pieces for successive operations in the past have proved complicated, subject to timing difficulties and expensive. The present invention solves these and other problems by providing a part conveying pallet which may be supported, selectively, on various sets of vertically aligned rails, two each. The pallet is provided with two pairs of upper rollers, one pair at either side thereof, and two pairs of lower rollers, one pair at either side thereof. Intermediate these upper and lower rollers, which are fixed in position on the pallet, is a pair of shiftable arms linked together for simultaneous movement. Each arm has a clamping roller at either end thereof. In the normal position the pallet is supported on the main track comprised of a pair of vertically aligned rails by virtue of the upper and lower rollers stationed on the same side of the pallet and riding on the upper and lower rails comprising said main track. The corresponding clamping rollers engage the upper rail whereby the pallet is cantilevered from the main track. When the pallet is moved along the main track until such time as the upper and lower rollers on the side opposite the main track come into contact with those portions of vertically aligned upper and lower rails comprising a side track, the side track being initially parallel to the main track, the pallet thus being supported simultaneously for a brief period on both the main track and the side track, the shiftable arms are actuated during such brief period whereby to disengage the clamping rollers from the main track upper rail and to immediately engage the other clamping rollers with the upper rail of the side track whereby the pallet is thereby cantilevered from the side track. During this brief period the pallet is driven by both the main track drive and the side track drive, each drive following its respective track, by virtue of means on the the pallet adapted to engage both drives simultaneously when the tracks parallel one another, at such time the tracks along being closely adjacent one another.

BRIEF DESCRIPTION OF THE DRAWINGS

FIG. 1 is a side elevation of the pallet and conveyor mechanism (partially fragmentary) according to this invention, FIG. 2 is a front elevation taken from the right side of FIG. 1, FIG. 3 is a schematic plan view showing the general arrangement of the main track and a plurality of side tracks and work stations to be serviced by the pallet-conveyor system of this invention, FIG. 4 is a front elevation, with parts broken away, of the pallet and track mechanisms including within the scope of this invention showing the pallet clamped in cantilevered condition on the main, left-hand track means as viewed in this Figure, FIG. 5 is a view similar to FIG. 4 but with the pallet clamped in cantilevered condition on the side, right-hand track means as viewed in this Figure, FIG. 6 is a perspective view of portions of the pallet and track mechanisms, and FIG. 7 is a view similar to FIG.4 but showing the pallet cantilivered on the main track in an area of the system wherein there is no side track.

DESCRIPTION OF THE PREFERRED EMBODIMENT

Referring first to FIGS. 6 and 3, the basic elements of the involved mechanisms will be described. The parts conveyor pallet is generally indicated at 10. This pallet 10 is arranged to ride on and along a main track comprised of a pair of vertically aligned, tubular rails 11a and 11b. From time to time, however, the pallet will ride on and along one or more side tracks each of which is comprised of a pair of vertically aligned, tubular rails 12a and 12b. Journaled in the pallet 10 is a first pair of upper rollers 13 and a second pair of upper rollers 14. Also journaled in this pallet 10 is a first pair of lower rollers 15 and a second pair of lower rollers 16. All of these rollers 13, 14, 15 and 16 are fixed in position on the pallet 10.

Intermediate the pairs of upper and lower rollers is a first pair of clamping rollers 17 and a second pair of clamping rollers 18. Each clamping roller 17 is journaled on one end of a separate arm 19a, 19b; the clamping rollers 18 are mounted on the other ends of these arms 19a and 19b. The arms 19a and 19b are fixed on a rod 20 so that they will move together. The rod 20 is suitably journaled in the pallet 10. In the position shown in FIGS. 6 and 7 the clamping rollers 17 are engaged with the upper rail 11a so that, by virtue of the rollers 13, 15 and 17, the pallet 10 is cantilevered from the main track comprised of the vertically aligned, tubular rails 11a and 11b. It is true, however, that during the time portions of the side track rails 12a, 12b are parallel to the main track rails 11a, 11b the rollers 14 and 16 will engage the respective rails 12a, 12b; this is the condition specifically illustrated in FIG. 6. FIG. 7, therefore, shows the pallet 10 as supported from the main track rails 11a, 11b either prior to, or after, the pallet is brought into the vicinity of any of the side tracks 12a, 12b.

Fixed on one side of the arm 19a is a back piece or cam plate 21. This is perhaps best seen in FIGS. 1 and 2. The cam plate 21 has downwardly projecting cam portions 22 and 23 located at the opposite ends thereof. A shift bar 24 is slidably arranged in the pallet 10 between a first and a second position. The bar 24 is partially cut away at 25 and 26 to accommodate a pair of cam rollers 27 and 28 which are journaled on the bar 24. In view of the fact that the bar 19a, the cam plate 21, the rod 20 and the bar 19b all move together as a unit when actuated by movement of the bar 24 as will be further described, only one such shiftable bar 24 is required.

In the first position of the shiftable bar 24 the roller 27 engages the cam projection 22 whereby to move the cam plate 21 and the arm 19a into such position that the clamping rollers 17 engage the upper rail 11a of the main conveyor track. This is best seen in FIGS. 2, 4 and 6. In this position, as is best seen in FIG. 7, the pallet 10 is cantilevered from the main track 11a, 11b by virtue of engagement of the upper rollers 13 with the upper tubular member 11a, engagement of the clamping rollers 17 with this same tubular member 11a, and engagement of the lower rollers 15 with the lower tubular member 11b. The pair of upper rollers 14 and pair of lower rollers 16 are out of engagement with anything at this point as are also the clamping rollers 18. When, however, the pallet 10 comes to a point wherein the side track rails 12a, 12b are parallel to the main track rails 11a, 11b the rollers 14 and 16 are so positioned that they will contact these side track rails. The clamping rollers 18, however, at the very point the rollers 14 and 16 first come into contact with the rails 12a, 12b will be spaced from the rail 12a until the shiftable bar 24 is actuated. Thus the main support for the pallet 10 at this point continues to be its cantilevered arrangement with respect to the main tracks rails 11a, 11b.

When the pallet 10 is in position with respect to the main track rails 11a, 11b and the side track rails 12a, 12b as indicated in FIGS. 4 and 5, this being that stage wherein portions of the rails 11a, 11b, 12a and 12b are parallel to one another, it again being noted that initially the pallet 10 is cantilevered from the main track rails 11a, 11b as indicated in FIGS. 4 and 7, and it is desired to shift the cantilever support from the main track to the side track, the shiftable bar 24 is moved from left to right as viewed in FIG. 4. Such movement of the bar 24 will bring the various operating parts into the position shown in FIG. 5. Movement of the bar 24 may be accomplished by any conventional means such as an air operated plunger generally indicated at 29 in FIG. 4. Movement of the bar 24 from the left-hand position shown in FIG. 4 to the right-hand position shown in FIG. 5 results in the roller 27 moving away from the depending cam surface 22 of the back cam plate 21 fixed to the arm 19a while the cam roller 28 will move into contact with the cam surface 23, also a part of the cam plate 21, whereby to rock the plate 21 and arm 19a in a counterclock-wise direction along with the rod 20. This movement of the arm 19a, and also of the similar arm 19b which is fixed on the rod 20 as earlier described, brings the clamping rollers 17 out of contact with the upper main track rail 11a while simultaneously bringing the clamping rollers 18 into clamping engagement with the upper side track rail 12a whereby the pallet 10 is cantilevered from the side track 12a, 12b by virtue of the rollers 14 and 16 in cooperation with the clamping rollers 18. As noted earlier, this shift of the pallet 10 from its cantilevered support from the main track 11a, 11b to its similar cantilevered support from the side track 12a, 12b occurs when portions of the main track and side track are parallel to one another. Continued movement of the pallet 10 in a manner to be described shortly results in the pallet moving along the side track 12a, 12b into position before an appropriate work station. This is generally indicated in FIG. 6 and is shown in somewhat greater detail in FIG. 3.

The pallet 10 is driven by means of one or more downwardly extending arms generally indicated at 30 in FIGS. 1 and 2; these arms are preferably spring loaded as shown in these Figures. Fastened to the lower ends of these arms is a plate 31 having some sort of friction material on the underside thereof. This spring loaded friction plate 31 frictionally engages the top of a flat segmented (crescent) chain, which is well known in the art, and which is disposed beneath the pallet as cantilevered from the main track 11a, 11b. This chain is continuously driven at a constant speed by conventional means, not shown, during operation of the pallet-conveyor mechanism. The spring loaded arms 30 and friction plate 31 cooperate with the roller 13, 15 and 17 to support the pallet 10; the arms 30 and plate 31 aid in stabilizing such pallet as it is moved along the tracks provided for it. The chain itself is generally indicated at 32 in FIGS. 1 and 3.

Turning now to FIG. 3, a series of work stations is illustrated as comprised of the mechanisms generally indicated at 33a, 33b and 33c. These work stations are only diagrammatically illustrated in that they may take any of a great variety of forms. An object of the invention is to divert the pallet 10 from the main track 11a, 11b to these work stations successively by reason of the side tracks 12a, 12b and the constructions heretofore detailed. As illustrated in connection with the work station 33a, there is a side track 12a, 12b which brings the pallet 10 into proper position with respect to this station. A side conveyor chain 34, which is like the segmented chain 32 and which runs at the same speed, furnishes the motive power from moving the pallet 10 along the side track 12a, 12b when it is cantilevered thereto as herein before described. As mentioned before, and as shown at 12c and 12d, portions of the side track 12a, 12b are parallel to portions of the main track 11a, 11b. The chain 32 and 34 also parallel one another in these regions. Just as the rail 12a is at the same level as the rail 11a, so is the chain 34 at the same level as the chain 32. The plate 31 is of such width that it extends outwardly beyond the chain 32. Thus, when the pallet is moved into the region at which the track portion 12c is parallel to the rail 11a and at which time the chain 34 is parallel to, and adjacent to, the chain 32, such plate 31 will engage the chain 34 while it is still engaged with the chain 32. It will be apparent, therefore, that for a relatively brief period not only is the pallet 10 supported from the main track 11a, 11b and side track 12a, 12b (in the vicinity, for example, of the side track portion 12c) but also such pallet 10 is driven by both the chains 32 and 34. It is at this point that the bar 24 is actuated so as to move the combined arm 19a and cam plate 21 from the position of FIG. 4 to that of FIG. 5 whereby to disengage the pallet 10 from cantilevered support on the main track 11a, 11b and to effect a similar cantilevered engagement of the pallet 10 on the side track 12a, and 12b.

It will be apparent, therefore, that continued movement of the chains 32 and 34 will result in the pallet 10 moving along the side track 12a, 12b to the work station, for example, 33a. Appropriate mechanism, not shown, will be employed to stop the pallet in proper position beneath the working mechanism at the station 33a. Such means are conventional in conveyor systems.

It will be understood that the arrangement just described in connection with the work station 33a will be repeated for each of the work stations 33b and 33c and for any others that may be included in the system.

As been seen in FIGS. 1 and 2 the main track rails 11a and 11b and the side track rails 12a and 12b may be suppoted by any convenient structure such as is generally indicated at 35 and 36. Additionally it has been found useful to provide mechanism, particularly in connection with the structure 36 and the various work stations 33a, 33b and 33c, for lifting the friction plate 31 from contact with the side conveyor 34 when the pallet has been stopped, so as to cut down wear on the friction material provided for this plate. Such mechanism may include an air cylinder 37, a pair of rods 38 and 39 pivoted to appropriate frame structure as indicated at 40 and a pivoted connection of the rod 39 to the plate 31 as indicated at 41. The cylinder 37 will also be pivoted to appropriate frame structure as indicated at 42. The upper ends of the arms 39 have pins 43 extending therefrom to a position beneath the plate 31. When the pallet 10 is stopped in position beneath a work station such as indicated at 33a by conventional means as earlier indicated, the air cylinder 37 will be actuated in a known manner whereby to move the arm 39 so as to lift the plate 31 from the chain it heretofore engaged.

The parts conveyor pallet 10 and related mechanism may include other features or benefit in conveyor systems. When, for example, it is desired to switch the pallet 10 from the main track to a selected side track, this may be accomplished by providing the pallet with a series of actuating pins 44a, b, c, and d located at different heights, one for each work station, which pins will engage appropriate hammer mechanism, at such time as the pallet 10 is riding on both the main track and a side track, whereby the plunger 29 will be actuated to strike the bar 24 and shift it, for example, from the position of FIG. 4 to that of FIG. 5 whereby to effect transfer of the pallet 10 from cantilevered engagement on the main track to similar cantilevered engagement on the side track. The details of this mechanism are not shown.

Considering the pallet and conveyor mechanism generally, although not shown in detail, it will be understood that the pins 44a, b, c and d located at different heights, are designed to actuate switch mechanisms according to the particular work station that the pallet is to be guided next. The pin and its respective mechanism will actuate the air operated plunger 29 previously mentioned whereby to at that point effect transfer of the pallet 10 from its cantilevered position on the main track 11a, 11b to similar cantilevered position on the particular side track 12a,12b selected as determined by position of the involved pin 44. Other conventional mechanism will stop movement of the pallet 10 and lock it in place under the particular work station 33 selected. The air cylinder 37 and related mechanisms, although shown in FIG. 1 as positioned under the main track chain 32, will normally be associated with the side track chain 34 so that when the pallet 10 is locked beneath a work station 33, actuation of the air cyclinder 37 will cause the friction plate 31 to be urged against its spring means and out of drag contact with the flat segmented (cresent) chain 34 so as to prevent wear on this plate. When the pallet is unlocked and the plate 31 again brought into contact with the chain 34, the pallet will move along the side track until it reaches, for example, side track portion 12d which is parallel to the main track 11a. Mechanisms similar to those previously described will actuate another air operated plunger 29 whereby to actuate the bar 24 and move it from the right-hand position shown in FIG. 5 to the left-hand position shown in FIG. 4 so that the pallet will again be supported in cantilever fashion from the main track 11a, 11b. The spring loaded friction plate 31 which extends beyond the side track chain 34 will at this time be in engagement with the main track chain 32 whereby the pallet will now continue its movement on the main track until shunted to another side track for performance of another operation by another work station, such further transfer of the pallet from the main track to a side track to be accomplished as described in connection with the station 33a.

It will be apparent to those skilled in the art that modifications may be made in this invention without departing from the scope and spirit thereof. Although the invention has been described in terms of particular structures, mechanisms and arrangements, this has been done for exemplary purposes only and the invention is not to be limited to these unless they are specifically set forth in the subjoined claims.

The embodiments of the invention in which an exclusive property or privilege is claimed are defined as follows:

1. A pallet adapted to be supported in cantilever fashion from a main track comprised of a first pair of parallel, vertically aligned elongated members, said pallet comprising a body, a pair of first upper rollers journaled in said body at one side thereof, a pair of first lower rollers journaled in said body at said one side, and a first pair of clamping rollers mounted in said body for selective movement towards and away from said first upper rollers, each of said first clamping rollers being journaled on a separate arm, both said separate arms being fixed on a common shaft rotatably mounted in said pallet for simultaneous movement with said shaft when said shaft is rotated, and means to rotate said shaft, whereby when said first upper rollers are engaged on one of said elongated members and said first lower rollers are engaged on the other of said elongated members, movement of said first clamping rollers into engagement with said one of said first pair of elongated members will result in said pallet being cantilevered from said main track.

2. The pallet of claim 1 in which there is a pair of second upper rollers journaled in said body at an opposite side thereof, a pair of second lower rollers journaled in said body at said opposite side, and a pair of second clamping rollers, said pair of second clamping rollers being movable towards and away from said pair of second upper rollers, whereby said pallet may be selectively cantilevered from tracks located adjacent said one side and adjacent said opposite side.

3. The pallet of claim 2 in which each of said second clamping rollers is journaled on the respective one of said separate arms, whereby when said first pair of clamping rollers moves towards said first pair of upper rollers said second pair of clamping rollers moves away from said second pair of upper rollers and vice versa.

4. The pallet of claim 3 in which said means to rotate said shaft comprises a cam plate fixed to one said separate arm, said cam plate having a cam surface thereon, and a shift bar slidably mounted in said pallet, said shift bar having contact means to contact said cam surface, whereby when said shift bar is slid in said pallet so that said contact means strikes said cam surface, said cam plate, said separate arms and said rod are rotated to bring said first clamping rollers into engagement with said one of said elongated members, and whereby when said shift bar is slid in said pallet in an opposite direction, said first pair of clamping rollers is moved out of engagement with said one of said elongated members and said second pair of clamping rollers is moved towards said second pair of upper rollers.

5. The pallet of claim 1 in which said means to rotate said shaft comprises a cam plate fixed to one said separate arm, said cam plate having a cam surface thereon, and a shift bar slidably mounted in said pallet, said shift bar having contact means to contact said cam surface, whereby when said shift bar is slid in said pallet so that said contact means strikes said cam surface, said cam plate, said separate arms and said rod are rotated to bring said first clamping rollers into engagement with said one of said elongated members.

* * * * *